(12) United States Patent
Isogawa et al.

(10) Patent No.: US 9,011,272 B2
(45) Date of Patent: Apr. 21, 2015

(54) GOLF BALL

(71) Applicant: SRI Sports Limited, Kobe-shi, Hyogo (JP)

(72) Inventors: Kazuhiko Isogawa, Hyogo (JP); Keiji Ohama, Hyogo (JP); Yoshiko Matsuyama, Hyogo (JP); Seiichiro Endo, Hyogo (JP)

(73) Assignee: Dunlop Sports Co., Ltd., Kobe (JP)

( * ) Notice: Subject to any disclaimer, the term of this patent is extended or adjusted under 35 U.S.C. 154(b) by 0 days.

(21) Appl. No.: 13/898,317

(22) Filed: May 20, 2013

(65) Prior Publication Data

US 2013/0252763 A1 Sep. 26, 2013

Related U.S. Application Data

(62) Division of application No. 12/846,185, filed on Jul. 29, 2010, now abandoned.

(30) Foreign Application Priority Data

Aug. 26, 2009 (JP) .................................. 2009-194918
Mar. 30, 2010 (JP) .................................. 2010-076562

(51) Int. Cl.
*A63B 37/06* (2006.01)
*A63B 37/12* (2006.01)
(Continued)

(52) U.S. Cl.
CPC ......... *A63B 37/0023* (2013.01); *A63B 37/0022* (2013.01); *A63B 37/0031* (2013.01); *A63B 37/0033* (2013.01); *A63B 37/0043* (2013.01); *A63B 37/0045* (2013.01); *A63B 37/0062* (2013.01); *A63B 37/0064* (2013.01); *A63B 37/0065* (2013.01); *A63B 37/0067* (2013.01);
(Continued)

(58) Field of Classification Search
USPC ................. 473/357, 361, 363–365, 370, 371, 473/373–378
See application file for complete search history.

(56) References Cited

U.S. PATENT DOCUMENTS 5,409,233 A * 4/1995 Kennedy ........................ 473/377
5,494,291 A * 2/1996 Kennedy ........................ 473/378
(Continued)

FOREIGN PATENT DOCUMENTS

JP 2000-230147 A 8/2000
JP 2002-53799 A 2/2002
(Continued)

OTHER PUBLICATIONS

Japanese Office Action, dated Nov. 13, 2012, for Japanese Application No. 2010-076562, with partial English translation.

*Primary Examiner* — Gene Kim
*Assistant Examiner* — John E Simms, Jr.
(74) *Attorney, Agent, or Firm* — Birch, Stewart, Kolasch & Birch, LLP

(57) ABSTRACT

Golf ball 2 has spherical core 4, cover 6 situated on the external side of the core 4, and paint layer 8 situated on the external side of the cover 6. The cover 6 has a Shore D hardness of no greater than 61. The paint layer 8 has a Martens hardness of no greater than 2.0 mgf/$\mu$m$^2$. The base polymer of the paint layer 8 is a polyurethane obtained by a reaction of a polyol with a polyisocyanate. The polyisocyanate contains a buret-modified form of hexamethylene diisocyanate. The cover 6 has a thickness of 0.3 mm or greater and 1.0 mm or less. The paint layer 8 has a thickness of 5 $\mu$m or greater and 40 $\mu$m or less.

22 Claims, 1 Drawing Sheet

(51) Int. Cl.

| | | |
|---|---|---|
| *A63B 37/00* | (2006.01) | |
| *C08G 18/78* | (2006.01) | |
| *C08G 59/54* | (2006.01) | |
| *C09D 163/00* | (2006.01) | |
| *C09D 175/06* | (2006.01) | |

(52) U.S. Cl.
CPC ..... *A63B 37/0075* (2013.01); *A63B 2037/0079* (2013.01); *C08G 18/7831* (2013.01); *C08G 59/54* (2013.01); *C09D 163/00* (2013.01); *C09D 175/06* (2013.01); *A63B 37/0087* (2013.01)

(56) References Cited

U.S. PATENT DOCUMENTS

| | | | |
|---|---|---|---|
| 5,902,191 A * | 5/1999 | Masutani et al. | 473/365 |
| 6,096,851 A * | 8/2000 | Maruoka et al. | 528/85 |
| 6,309,706 B2 * | 10/2001 | Maruoka et al. | 427/385.5 |
| 6,365,679 B1 * | 4/2002 | Crast et al. | 525/440.03 |
| 6,435,983 B2 * | 8/2002 | Kennedy et al. | 473/371 |
| 6,454,667 B1 * | 9/2002 | Iwami | 473/378 |
| 6,488,596 B1 * | 12/2002 | Maruoka et al. | 473/378 |
| 7,572,508 B2 * | 8/2009 | Lutz et al. | 428/423.1 |
| 2001/0003717 A1 * | 6/2001 | Maruoka et al. | 473/371 |
| 2001/0055997 A1 * | 12/2001 | Kennedy et al. | 473/374 |
| 2003/0232665 A1 | 12/2003 | Sasaki et al. | |
| 2004/0043838 A1 * | 3/2004 | Isogawa et al. | 473/378 |
| 2004/0254032 A1 * | 12/2004 | Lutz et al. | 473/378 |
| 2006/0025238 A1 * | 2/2006 | Endo et al. | 473/371 |
| 2007/0015603 A1 * | 1/2007 | Watanabe et al. | 473/371 |
| 2008/0085783 A1 * | 4/2008 | Isogawa et al. | 473/378 |
| 2009/0124420 A1 * | 5/2009 | Kamino et al. | 473/374 |

FOREIGN PATENT DOCUMENTS

| | | |
|---|---|---|
| JP | 2004-89364 A | 3/2004 |
| JP | 2006-75210 A | 3/2006 |

* cited by examiner

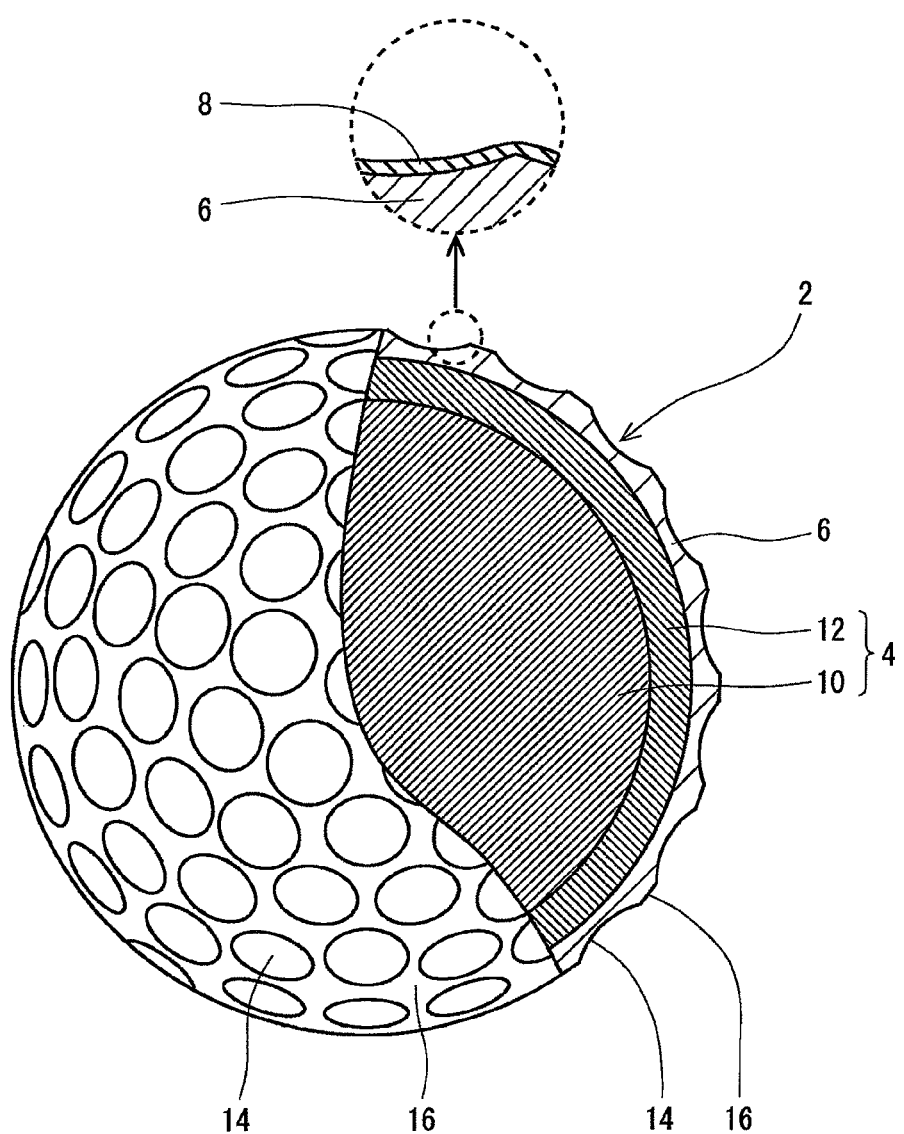

GOLF BALL

CROSS REFERENCE

The present application is a 37 C.F.R. §1.53(b) divisional of, and claims priority to, U.S. application Ser. No. 12/846,185, filed Jul. 29, 2010. Priority is also claimed to Japanese Patent Application No. 2009-194918 filed on Aug. 26, 2009 and Japanese Patent Application No. 2010-076562 filed on Mar. 30, 2010. The entire contents of each of these applications is hereby incorporated by reference.

BACKGROUND OF THE INVENTION

1. Field of the Invention

The present invention relates to golf balls. More particularly, the present invention relates to a golf ball having a core, a cover and a paint layer.

2. Description of the Related Art

General golf balls have a core, a cover situated on the external side of this core, and a paint layer situated on the external side of this cover. The paint layer protects the cover and a mark layer. The paint layer is also responsible for aesthetic appearance of the golf ball. In addition, the paint layer is also responsible for antifouling property of the golf ball. Japanese Unexamined Patent Application Publication No. 2000-84116 (US 2001/003717) discloses a paint layer containing a polyurethane obtained by a reaction of an isocyanate with a certain polyol. This paint layer is excellent in adhesiveness with the cover. Japanese Unexamined Patent Application Publication No. 2000-230147 discloses a paint composition for golf balls containing a polyurethane having a specified viscosity. A layer obtained with this paint composition is excellent in adhesiveness with the cover.

Top concern to golf players for golf balls is their flight performances. The golf players particularly place great importance on travel distance attained by shots with a driver. The golf players also place great importance on travel distance on shots with a long iron and a middle iron.

Golf players place great importance also on spin performances of golf balls. Great back spin rate results in small run. For golf players, golf balls which are liable to be spun backwards are apt to be rendered to stop at a target position. Great side spin rate results in easily curved trajectory of the golf ball. For golf players, golf balls which are liable to be spun sidewise are apt to allow their trajectory to curve intentionally. The golf balls that are excellent in spin performances are excellent in control performances. High-level golf players particularly place great importance on control performances on shots with a short iron.

Japanese Unexamined Patent Application Publication No. 2004-8404 (US 2003/232665) discloses a golf ball provided with a cover having a Shore D hardness of 30 to 55. This cover is responsible for spin performances of the golf ball. Japanese Unexamined Patent Application Publication No. 2006-34740 (US 2006/025238) discloses a golf ball provided with a cover having a small volume. The base material of this cover is a polyurethane. This cover is responsible for spin performances of the golf ball. This cover does not impair the flight performances on shots with a driver.

When a golf ball placed on rough is hit, turfgrass will be interposed between the club face and the golf ball. Owing to this turfgrass, slipping of the golf ball occurs on the club face. A shot accompanied by slipping results in reduced spin rate. This phenomenon is referred to as a "flyer". The flyer also occurs when water is interposed between the club face and the golf ball in case of rain.

When a flyer shot is made, the golf ball falls at a point farther than the point intended by the golf player. The flyer makes it difficult to predict the point of fall by the golf player. Golf balls that are likely to result in a flyer are inferior in control performances. Golf players expect golf balls less likely to result in a flyer. In other words, golf players expect golf balls that are superior in stability of the spin rate.

As described above, a soft cover can achieve excellent spin performances. However, a soft cover is greatly deformed upon shots. When a cover is deformed, the paint layer is also deformed following the deformation of the cover. When a cover is excessively deformed, a crack is generated on the paint layer. Abrasion of the paint layer from the cover may be also caused.

An object of the present invention is to provide a golf ball that is excellent in spin performances, stability of the spin rate and durability of the paint layer.

SUMMARY OF THE INVENTION

The golf ball according to the present invention has a core, a cover situated on the external side of the core, and a paint layer situated on the external side of the cover. The cover has a Shore D hardness of no greater than 61. The paint layer has a Martens hardness of no greater than 2.0 mgf/$\mu$m$^2$.

In the golf ball according to the present invention, the cover and the paint layer are soft. These cover and paint layer are responsible for spin performances. When this golf ball is hit with a short iron, a great spin rate is attained. This paint layer suppresses slipping of the golf ball on the club face. In other words, this paint layer is responsible for stability of the spin rate. This paint layer suppresses a flyer. When the golf ball is hit, the paint layer follows the cover as deformed. This paint layer is excellent in durability.

As the base polymer of the paint layer, a polyurethane obtained by a reaction of a polyol with a polyisocyanate may be used. Preferably, the polyisocyanate contains a buret-modified form of hexamethylene diisocyanate. The percentage of the buret-modified form relative to the total amount of the polyisocyanate is no less than 20% by weight. Preferably, the NCO/OH ratio in the polyurethane is 1.0/1.0 or greater and 1.4/1.0 or less. Preferably, the polyol has a weight average molecular weight of 50 or greater and 2,000 or less. Preferably, the paint layer has a thickness of 5 $\mu$m or greater and 40 $\mu$m or less.

Preferably, the base polymer of the cover is at least one selected from the group consisting of a polyurethane, an ionomer resin, a polyamide, a polyester, a polystyrene and a polyolefin. Preferably, the cover has a Shore D hardness of no greater than 55. Preferably, the cover has a thickness of 0.3 mm or greater and 1.0 mm or less.

Preferably, the amount of compressive deformation of the core is 1.8 mm or greater and 4.0 mm or less as measured under a condition in which the initial load is 98 N and the final load is 1,274 N.

The core may have a center and a mid layer situated on the external side of the center. Preferably, the amount of compressive deformation of the center is 1.5 mm or greater and 5.0 mm or less as measured under a condition in which the initial load is 98 N and the final load is 1,274 N. Preferably, the center has a diameter of 30 mm or greater and 41.5 mm or less. Preferably, the center has a weight of 25 g or greater and 42 g or less. Preferably, the base polymer of the mid layer is at least one selected from the group consisting of an ionomer resin, a styrene block-containing thermoplastic elastomer, a thermoplastic polyester elastomer, a thermoplastic polyamide elastomer, a thermoplastic polyurethane elastomer and a thermoplastic polyolefin elastomer. Preferably, the mid layer has a Shore D hardness of 40 or greater and 75 or less. Preferably, the mid layer has a thickness of 0.3 mm or greater and 2.5 mm or less.

Preferably, the amount of compressive deformation of the golf ball is 2.0 mm or greater and 3.5 mm or less as measured under a condition in which the initial load is 98 N and the final load is 1,274 N.

BRIEF DESCRIPTION OF THE DRAWINGS

FIG. 1 shows a partially cut off cross-sectional view illustrating a golf ball according to one embodiment of the present invention.

DESCRIPTION OF THE PREFERRED EMBODIMENTS

Hereinafter, the present invention will be described in detail according to the preferred embodiments with appropriate references to the accompanying drawing.

Golf ball 2 shown in FIG. 1 has spherical core 4, cover 6 situated on the external side of the core 4, and paint layer 8 situated on the external side of the cover 6. The core 4 has spherical center 10, and mid layer 12 situated on the external side of the center 10. A large number of dimples 14 are formed on the surface of the cover 6. Of the surface of the cover 6, a part other than the dimples 14 is land 16. The golf ball may have a core not having the mid layer 12. The golf ball may have an inner cover situated on the internal side of the cover 6.

This golf ball 2 has a diameter of from 40 mm to 45 mm. From the standpoint of conformity to a rule defined by United States Golf Association (USGA), the diameter is preferably no less than 42.67 mm. In light of suppression of the air resistance, the diameter is preferably no greater than 44 mm, and more preferably no greater than 42.80 mm. The weight of this golf ball 2 is 40 g or greater and 50 g or less. In light of attainment of great inertia, the weight is preferably no less than 44 g, and more preferably no less than 45.00 g. From the standpoint of conformity to a rule defined by USGA, the weight is preferably no greater than 45.93 g.

The center 10 is obtained through crosslinking of a rubber composition. Examples of preferable base rubber include polybutadienes, polyisoprenes, styrene-butadiene copolymers, ethylene-propylene-diene copolymers and natural rubbers. In light of the resilience performance, polybutadienes are preferred. When other rubber is used in combination with polybutadiene, it is preferred that the polybutadiene is included as a principal component. Specifically, it is preferred that the percentage of polybutadiene occupying the entire base rubber is no less than 50% by weight, and particularly no less than 80% by weight. In particular, polybutadienes having a percentage of cis-1,4 bonds of no less than 40% by mole, and particularly no less than 80% by mole are preferred.

For crosslinking of the center 10, a co-crosslinking agent is used. Preferable examples of the co-crosslinking agent in light of the resilience performance include monovalent or bivalent metal salts of an α,β-unsaturated carboxylic acid having 2 to 8 carbon atoms. Specific examples of the preferable co-crosslinking agent include zinc acrylate, magnesium acrylate, zinc methacrylate and magnesium methacrylate. Zinc acrylate and zinc methacrylate are particularly preferred on the grounds that a high resilience performance can be achieved.

The amount of the co-crosslinking agent is preferably 10 parts by weight or greater and 50 parts by weight or less relative to 100 parts by weight of the base rubber. The center 10 including the co-crosslinking agent in an amount of no less than 10 parts by weight can achieve excellent resilience performance of the golf ball 2. In this respect, the amount is more preferably no less than 15 parts by weight. The center 10 including the co-crosslinking agent in an amount of no greater than 50 parts by weight enables excellent feel at impact of the golf ball 2 to be achieved. In this respect, the amount is more preferably no greater than 45 parts by weight.

Into the rubber composition of the center 10, an organic peroxide may be preferably blended together with the co-crosslinking agent. The organic peroxide serves as a crosslinking initiator. The organic peroxide is responsible for the resilience performance. Examples of suitable organic peroxide include dicumyl peroxide, 1,1-bis(t-butylperoxy)-3,3, 5-trimethylcyclohexane, 2,5-dimethyl-2,5-di(t-butylperoxy) hexane and di-t-butyl peroxide. Particularly versatile organic peroxide is dicumyl peroxide.

The amount of the organic peroxide is preferably 0.1 parts by weight or greater and 3.0 parts by weight or less relative to 100 parts by weight of the base rubber. The center 10 including the organic peroxide in an amount of no less than 0.1 parts by weight can achieve excellent resilience performance of the golf ball 2. In this respect, the amount is more preferably no less than 0.3 parts by weight, and particularly preferably no less than 0.5 parts by weight. The center 10 including the organic peroxide in an amount of no greater than 3.0 parts by weight enables excellent feel at impact of the golf ball 2 to be achieved. In this respect, the amount is more preferably no greater than 2.5 parts by weight.

Into the center 10 may be blended a filler for the purpose of adjusting specific gravity and the like. Illustrative examples of suitable filler include zinc oxide, barium sulfate, calcium carbonate and magnesium carbonate. Powders of a highly dense metal may be blended as a filler. Specific examples of the highly dense metal include tungsten and molybdenum. The amount of the filler is determined ad libitum so that the intended specific gravity of the center 10 can be accomplished. Particularly preferable filler is zinc oxide. Zinc oxide serves not only to merely adjust the specific gravity but also as a crosslinking activator. Various kinds of additives such as sulfur, a sulfur compound, an anti-aging agent, a coloring agent, a plasticizer, a dispersant and the like may be blended in an adequate amount in the center 10 as needed. Into the center 10 may be also blended crosslinked rubber powders or synthetic resin powders.

The center 10 has a surface hardness H1 of preferably 60 or greater and 95 or less. As described later, this golf ball 2 has a soft cover 6. Upon hitting of this golf ball 2, the center 10 is greatly deformed resulting from the cover 6 being soft. The center 10 having a surface hardness H1 of no less than 60 can achieve excellent resilience performance of the golf ball 2. In this respect, the surface hardness H1 is more preferably no less than 70, and particularly preferably no less than 75. The center 10 having a surface hardness H1 of no greater than 95 does not impair the feel at impact of the golf ball 2. In this respect, the surface hardness H1 is more preferably no greater than 90, and particularly preferably no greater than 85. The surface hardness is measured by pushing a JIS-C hardness scale on the surface of the center 10. For the measurement, an automated rubber hardness scale ("P1", trade name, available from Koubunshi Keiki Co., Ltd.) which is equipped with this hardness scale is used.

The amount of compressive deformation of the center 10 is preferably 1.5 mm or greater and 5.0 mm or less. The center 10 having an amount of compressive deformation of no less than 1.5 mm does not impair the feel at impact of the golf ball 2. In this respect, the amount of compressive deformation is more preferably no less than 2.0 mm. The center 10 having an amount of compressive deformation of no greater than 5.0 mm can achieve excellent resilience performance of the golf ball 2. In this respect, the amount of compressive deformation is more preferably no greater than 4.5 mm, and particularly preferably no greater than 4.0 mm.

Upon measurement of the amount of compressive deformation, the spherical body (center 10, core 4 or golf ball 2) is first placed on a hard plate made of metal. Next, a cylinder made of metal gradually descends toward the spherical body. The spherical body interposed between the bottom face of the cylinder and the hard plate is deformed. A migration distance of the cylinder, starting from the state in which an initial load of 98 N is applied to the spherical body up to the state in which a final load of 1,274 N is applied thereto is the amount of compressive deformation.

The center 10 has a diameter of preferably 30 mm or greater and 41.5 mm or less. The center 10 has a weight of preferably 25 g or greater and 42 g or less. The crosslinking temperature of the center 10 is usually 140° C. or higher and 180° C. or lower. The crosslinking time of the center 10 is usually 10 min or longer and 60 min or shorter. The center may be formed with two or more layers. The center may have a rib on the surface thereof. The golf ball may have a hollow center.

For the mid layer 12, a thermoplastic resin composition is suitably used. Examples of the base polymer of the resin composition include ionomer resins, styrene block-containing thermoplastic elastomers, thermoplastic polyester elastomers, thermoplastic polyamide elastomers, thermoplastic polyurethane elastomers and thermoplastic polyolefin elastomers. In particular, ionomer resins are preferred. The ionomer resins are highly elastic. As described later, this golf ball 2 has a soft cover 6. Upon hitting of this golf ball 2, the mid layer 12 is greatly deformed resulting from the cover 6 being soft. The mid layer 12 including the ionomer resin is responsible for the resilience performance.

An ionomer resin and other resin may be used in combination. When these are used in combination, the ionomer resin is included as the principal component of the base polymer, in light of the resilience performance. The percentage of the ionomer resin in the entire base polymer is preferably no less than 50% by weight, more preferably no less than 60% by weight, and particularly preferably no less than 65%.

Examples of preferred ionomer resin include binary copolymers formed with α-olefin and an α,β-unsaturated carboxylic acid having 3 to 8 carbon atoms. Preferable binary copolymer comprises 80% by weight or more and 90% by weight or less α-olefin, and 10% by weight or more and 20% by weight or less α,β-unsaturated carboxylic acid. This binary copolymer provides excellent resilience performance. Examples of other ionomer resin preferred include ternary copolymers formed with α-olefin, an α,β-unsaturated carboxylic acid having 3 to 8 carbon atoms, and an α,β-unsaturated carboxylate ester having 2 to 22 carbon atoms. Preferable ternary copolymer comprises 70% by weight or more and 85% by weight or less α-olefin, 5% by weight or more and 30% by weight or less α,β-unsaturated carboxylic acid, and 1% by weight or more and 25% by weight or less α,β-unsaturated carboxylate ester. This ternary copolymer provides excellent resilience performance. In the binary copolymer and ternary copolymer, preferable α-olefin is ethylene and propylene, and preferable α,β-unsaturated carboxylic acid is acrylic acid and methacrylic acid. Particularly preferred ionomer resin is a copolymer formed with ethylene, and acrylic acid or methacrylic acid.

In the binary copolymer and ternary copolymer, a part of the carboxyl groups may be neutralized with a metal ion. Illustrative examples of the metal ion for use in the neutralization include sodium ion, potassium ion, lithium ion, zinc ion, calcium ion, magnesium ion, aluminum ion and neodymium ion. The neutralization may be carried out with two or more kinds of metal ions. Particularly suitable metal ion in light of the resilience performance and durability of the golf ball 2 is sodium ion, zinc ion, lithium ion and magnesium ion.

Specific examples of the ionomer resin include "Himilan® 1555", "Himilan® 1557", "Himilan® 1605", "Himilan® 1706", "Himilan® 1707", "Himilan® 1856", "Himilan® 1855", "Himilan® AM7311", "Himilan® AM7315", "Himilan® AM7317", "Himilan® AM7318", "Himilan® MK7320" and "Himilan® MK7329", trade names, available from Du Pont-MITSUI POLYCHEMICALS Co., Ltd.; "Surlyn® 6120", "Surlyn® 6320", "Surlyn® 6910", "Surlyn® 7930", "Surlyn® 7940", "Surlyn® 8140", "Surlyn® 8150", "Surlyn® 8940", "Surlyn® 8945", "Surlyn® 9120", "Surlyn® 9150", "Surlyn® 9910", "Surlyn® 9945", "Surlyn® AD8546", "HPF 1000" and "HPF 2000", trade names, available from Du Pont Kabushiki Kaisha; and "IOTEK 7010", "IOTEK 7030", "IOTEK 7510", "IOTEK 7520", "IOTEK 8000" and "IOTEK 8030", trade names, available from EXXON Mobil Chemical Corporation. Two or more kinds of the ionomer resins may be used in combination.

Preferable resin which may be used in combination with the ionomer resin is a styrene block-containing thermoplastic elastomer. The styrene block-containing thermoplastic elastomer includes a polystyrene block as a hard segment, and a soft segment. Typical soft segment is a diene block. Illustrative examples of the compound for the diene block include butadiene, isoprene, 1,3-pentadiene and 2,3-dimethyl-1,3-butadiene. Butadiene and isoprene are preferred. Two or more compounds may be used in combination.

The styrene block-containing thermoplastic elastomer may include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS or a hydrogenated product of SIBS. Exemplary hydrogenated product of SBS includes a styrene-ethylene-butylene-styrene block copolymer (SEBS). Exemplary hydrogenated product of SIS includes a styrene-ethylene-propylene-styrene block copolymer (SEPS). Exemplary hydrogenated product of SIBS includes a styrene-ethylene-ethylene-propylene-styrene block copolymer (SEEPS).

In light of the resilience performance of the golf ball 2, the content of the styrene component in the thermoplastic elastomer is preferably no less than 10% by weight, more preferably no less than 12% by weight, and particularly preferably no less than 15% by weight. In light of the feel at impact of the golf ball 2, the content is preferably no greater than 50% by weight, more preferably no greater than 47% by weight, and particularly preferably no greater than 45% by weight.

In the present invention, the styrene block-containing thermoplastic elastomer includes an alloy of olefin with one or more selected from the group consisting of SBS, SIS, SIBS, SEBS, SEPS and SEEPS, and hydrogenated products thereof. The olefin component in this alloy is speculated to contribute to improvement of the compatibility with other base polymer. When this alloy is used, the resilience performance of the golf ball 2 is improved. Preferably, olefin having 2 to 10 carbon atoms may be used. Illustrative examples of suitable olefin include ethylene, propylene, butene and pentene. Ethylene and propylene are particularly preferred.

Specific examples of the polymer alloy include "Rabalon® T3221C", "Rabalon® T3339C", "Rabalon® SJ4400N", "Rabalon® SJ5400N", "Rabalon® SJ6400N", "Rabalon® SJ7400N", "Rabalon® SJ8400N", "Rabalon® SJ9400N" and "Rabalon® SR04", trade names, available from Mitsubishi Chemical Corporation. Other specific examples of the styrene block-containing thermoplastic elastomer include "Epofriend A1010", trade name, available from Daicel Chemical Industries; and "Septon HG-252", trade name, available from Kuraray Co., Ltd.

Into the resin composition of the mid layer 12 may be blended a filler for the purpose of adjusting specific gravity and the like. Illustrative examples of suitable filler include zinc oxide, barium sulfate, calcium carbonate and magnesium carbonate. Powders of a highly dense metal may be blended as a filler. Specific examples of the highly dense metal include tungsten and molybdenum. The amount of the filler is determined ad libitum so that an intended specific gravity of the mid layer 12 can be attained. Into the mid layer 12 may be also blended a coloring agent, crosslinked rubber powders or synthetic resin powders.

The mid layer 12 has a hardness H2 of 40 or greater and 75 or less. The mid layer 12 having a hardness H2 of no less than 40 can achieve excellent resilience performance of the golf ball 2. In addition, with the mid layer 12 having a hardness H2 of no less than 40, a core 4 having energy growing gradient can be attained. This core 4 is responsible for suppression of the spin upon a shot with a driver. In these respects, the hardness H2 is more preferably no less than 45, and particularly preferably no less than 48. The mid layer 12 having a outer-hard/inner-soft structure H2 of no greater than 75 enables excellent feel at impact to be achieved. In this respect, the hardness H2 is more preferably no greater than 70, and particularly preferably no greater than 65.

The hardness H2 of the mid layer 12 and the hardness H3 of the cover 6 may be measured in accordance with a standard of "ASTM-D 2240-68". For the measurement, an automated rubber hardness scale which is equipped with a Shore D type hardness scale ("P1", trade name, available from Koubunshi Keiki Co., Ltd.) is used. For the measurement, a sheet which was formed by hot press is used having a thickness of about 2 mm and consisting of the same material as that of the mid layer 12 (or the cover 6). Prior to the measurement, the sheet is stored at a temperature of 23° C. for two weeks. When the measurement is carried out, three sheets are overlaid.

The mid layer 12 has a thickness of preferably 0.3 mm or greater and 2.5 mm or less. The mid layer 12 having a thickness of no less than 0.3 mm can achieve excellent resilience performance of the golf ball 2. In this respect, the thickness is more preferably no less than 0.5 mm, and particularly preferably no less than 0.7 mm. The mid layer 12 having a thickness of no greater than 2.5 mm does not impair the feel at impact of the golf ball 2. In this respect, the thickness Tm is more preferably no greater than 2.0 mm.

The amount of compressive deformation of the core 4 is preferably 1.8 mm or greater and 4.0 mm or less. The core 4 having the amount of compressive deformation of no less than 1.8 mm enables excellent feel at impact of the golf ball 2 to be achieved. In this respect, the amount of compressive deformation is more preferably no less than 2.0 mm, and particularly preferably no less than 2.2 mm. As described later, this golf ball 2 has a soft cover 6. Upon hitting of the golf ball 2, the core 4 is greatly deformed resulting from the cover 6 being soft. The core 4 having the amount of compressive deformation of no greater than 4.0 mm can achieve excellent resilience performance of the golf ball 2. In this respect, the amount of compressive deformation is more preferably no greater than 3.7 mm, and particularly preferably no greater than 3.4 mm.

The cover 6 is constituted with a resin composition. Illustrative examples of the base resin for the resin composition include polyurethanes, ionomer resins, polyamides, polyesters, polystyrenes and polyolefins. Two or more polymers may be used in combination.

A polymer suited for the cover 6 is a thermoplastic polyurethane elastomer. The thermoplastic polyurethane elastomers are soft. The thermoplastic polyurethane elastomer suppresses slipping of the golf ball 2 on the club face. When golf ball 2 having a cover 6 constituted with a thermoplastic polyurethane elastomer is hit with a short iron, a great spin rate is attained. The cover 6 constituted with a thermoplastic polyurethane elastomer is responsible for the control performance on a shot with a short iron. The thermoplastic polyurethane elastomer is also responsible for the scuff resistance performance of the cover 6. Moreover, due to the thermoplastic polyurethane elastomer, excellent feel at impact can be achieved upon hitting with a putter or short iron.

Other resin may be also used in combination with the thermoplastic polyurethane elastomer. In light of the control performance, the thermoplastic polyurethane elastomer is included in the base polymer as a principal component in the case of use in combination. The percentage of the thermoplastic polyurethane elastomer occupying the entire base polymer is preferably no less than 50% by weight, more preferably no less than 70% by weight, and particularly preferably no less than 85% by weight.

The thermoplastic polyurethane elastomer includes a polyurethane component as a hard segment, and a polyester component or a polyether component as a soft segment. Illustrative examples of the curing agent for the polyurethane component include an alicyclic diisocyanate, an aromatic diisocyanate and an aliphatic diisocyanate. Illustrative examples of the alicyclic diisocyanate include 4,4'-dicyclohexylmethane diisocyanate ($H_{12}$MDI), bis(isocyanatomethyl)cyclohexane ($H_6$XDI), isophorone diisocyanate (IPDI) and trans-1,4-cyclohexane diisocyanate (CHDI). In light of versatility and processability, $H_{12}$MDI is preferred. Illustrative examples of the aromatic diisocyanate include 4,4'-diphenylmethane diisocyanate (MDI) and toluene diisocyanate (TDI). Illustrative examples of the aliphatic diisocyanate include hexamethylene diisocyanate (HDI). Two or more kinds of the diisocyanate may be used in combination.

In particular, an alicyclic diisocyanate is preferred. Since the alicyclic diisocyanate has no double bond in the main chain, yellowing of the cover 6 can be suppressed. In addition, since an alicyclic diisocyanate is excellent in strength, the cover 6 can be prevented from being scuffed.

Thermoplastic polyurethane elastomers having a material hardness of no greater than 42, and still further no greater than 38 are particularly preferred. Such an elastomer enables the cover 6 to have a small hardness H3. For the measurement of the material hardness, a sheet consisting of the polymer alone may be used. The measuring method is the same as the measuring method of the hardness H2 of the mid layer 12.

Specific examples of the thermoplastic polyurethane elastomer include "Elastollan® XNY80A", "Elastollan® XNY85A", "Elastollan® XNY90A", "Elastollan® XNY97A", "Elastollan® XNY585", "Elastollan® XKP016N" and "Elastollan® ET858D", trade names, available from BASF Japan Ltd; and "Rezamin P4585LS" and "Rezamin PS62490", trade names, available from Dainichiseika Color & Chemicals Mfg. Co., Ltd.

Other resin suited for use in the cover 6 is an ionomer resin. The ionomer resin similar to those described above in connection with the mid layer 12 can be used for the cover 6. The ionomer resin may be used in combination with a styrene block-containing thermoplastic elastomer. The ionomer resin may be used in combination with an ethylene-methacrylic acid copolymer. Specific examples of the ethylene-methacrylic acid copolymer include "Nucrel® 1050H", trade name, available from Du Pont-MITSUI POLYCHEMICALS Co., Ltd.

Into the cover 6 may be blended a coloring agent such as titanium dioxide, a filler such as barium sulfate, a dispersant, an antioxidant, an ultraviolet absorbent, a light stabilizer, a fluorescent agent, a fluorescent brightening agent and the like as needed.

The cover 6 has a hardness H3 of no greater than 61. In other words, the cover 6 is soft. This cover 6 enables a great spin rate to be attained upon a shot with a short iron. This golf ball 2 is excellent in the control performance.

When the base material of the cover 6 is a polyurethane, the hardness H3 is preferably no greater than 55, more preferably no greater than 45, and particularly preferably no greater than 40. The hardness H3 is preferably no less than 20, more preferably no less than 25, and particularly preferably no less than 30.

When the base material of the cover 6 is an ionomer resin, the hardness H3 is preferably no greater than 61, more preferably no greater than 60, and particularly preferably no greater than 58. The hardness H3 is preferably no less than 40, more preferably no less than 44, and particularly preferably no less than 48.

The cover 6 has a thickness of preferably no greater than 1.0 mm. As described above, the cover 6 is soft. The soft cover 6 is disadvantageous in terms of the resilience coefficient of the golf ball 2. On a shot with a driver, both the mid layer 12 and the center 10 of the golf ball 2 are also deformed greatly. The cover 6 having a thickness of no greater than 1.0 mm does not adversely affect the resilience coefficient to a large extent on a shot with a driver, even when the cover 6 is soft. In light of the flight performance, the thickness is more preferably no greater than 0.9 mm, and particularly preferably no greater than 0.8 mm. In light of the spin performance, the thickness is preferably no less than 0.3 mm.

A reinforcing layer may be provided between the mid layer 12 and the cover 6. The reinforcing layer improves adhesion between the mid layer 12 and the cover 6. For the base polymer of the reinforcing layer, a two-component cured thermosetting resin may be suitably used. Specific examples of the two-component cured thermosetting resin include epoxy resins, urethane resins, acrylic resins, polyester based resins and cellulose based resins.

Particularly preferable polymer is a resin obtained by curing a bisphenol A type epoxy with a polyamide based curing agent. The bisphenol A type epoxy is obtained by a reaction of bisphenol A with an epoxy group-containing compound such as epichlorohydrin. The polyamide based curing agent has multiple amino groups, and one or more amide groups. This amino group can react with an epoxy group. Specific examples of the polyamide based curing agent include polyamide-amine curing agents and modified products of the same. Upon mixing of the epoxy and the polyamide based curing agent, the ratio of the epoxy equivalent, and the amine active hydrogen equivalent of the polyamide based curing agent is preferably 1.0/1.4 or greater and 1.0/1.0 or less.

The two-component cured urethane resin is also suited for the reinforcing layer. The two-component cured urethane resin is obtained by a reaction of a base material with a curing agent. A two-component cured urethane resin obtained by a reaction of a base material containing a polyol with a curing agent containing a polyisocyanate or a derivative thereof, or a two-component cured urethane resin obtained by a reaction of a base material containing an isocyanate group-ended urethane prepolymer with a curing agent having active hydrogen may be used. In particular, two-component cured urethane resins obtained by a reaction of a base material containing a polyol component with a curing agent containing a polyisocyanate or a derivative thereof are preferred.

The reinforcing layer particularly exerts its effect in the golf ball 2 in which the base material of the mid layer 12 is an ionomer resin, and the base material of the cover 6 is polyurethane. The reinforcing layer exerts its effect also in the golf ball 2 in which the base material of the mid layer 12 is a polyurethane, and the base material of the cover 6 is an ionomer resin.

The paint layer 8 has a Martens hardness H4 of no greater than 2.0 mgf/μm$^2$. This paint layer 8 is soft. This paint layer 8 suppresses slipping of the golf ball 2 on the club face. A great spin rate is attained upon hitting of the golf ball 2 with a short iron.

The paint layer 8 suppresses the slipping even when turfgrass is interposed between the club face and the golf ball 2. This paint layer 8 suppresses slipping even when water is interposed between the club face and the golf ball 2. This paint layer 8 is responsible for stability of the spin rate. This paint layer 8 suppresses the flyer. Golf players can easily let the golf ball drop at an intended position. This golf ball 2 is excellent in the control performance.

As described above, the cover 6 is soft. Upon hitting of this golf ball 2, the cover 6 is greatly deformed. Since the paint layer 8 is also soft, the paint layer 8 is deformed following the deformation of the cover 6. Even though the golf ball 2 is repeatedly hit, the paint layer 8 is less likely to be cracked. Even though the golf ball 2 is repeatedly hit, this paint layer 8 is less likely to be abraded from the cover 6.

In light of the control performance and durability, the paint layer 8 has a Martens hardness H4 of no greater than 1.4 mgf/μm$^2$, more preferably no greater than 1.0 mgf/μm$^2$, and particularly preferably no greater than 0.18 mgf/μm$^2$. The Martens hardness H4 is preferably no greater than 0.01 mgf/μm$^2$.

For the measurement of the Martens hardness H4, a nanoindenter "ENT-2100" available from Elionix Inc., is used. The measurement conditions are as in the following.
Load F: 20 mgf
Angle α of Berkovich indenter: 65.03°
Material of Berkovich indenter: SiO$_2$ The area As (h) is calculated based on the penetration depth h and the angle α of the indenter, according to the following formula:

$$As(h) = 3 * 3^{1/2} * \tan \alpha / \cos \alpha * h^2$$

The Martens hardness H4 is calculated based on the load F and the area As (h), according to the following formula:

$$H4 = F/As(h)$$

The measurement is carried out on a paint film sheet having a thickness of 100 μm.

The paint layer 8 is constituted with a resin composition. Preferable base resin of this resin composition is a two-component cured polyurethane. The two-component cured polyurethane is obtained by a reaction of a base material containing a polyol with a curing agent containing a polyisocyanate or a derivative thereof. The paint layer 8 including the two-component cured polyurethane is soft.

As the polyol for the base material, a polyol having a low molecular weight and a polyol having a high molecular weight may be used. Examples of the polyol having a low molecular weight include diols and triols. Specific examples of the diol include ethylene glycol, diethylene glycol, triethylene glycol, 1,3-butanediol, 1,4-butanediol, neopentyl glycol and 1,6-hexanediol. Specific examples of the triol include trimethylolpropane and hexanetriol. Examples of the polyol having a high molecular weight include polyether polyols such as polyoxyethylene glycol (PEG), polyoxypropylene glycol (PPG) and polyoxytetramethylene glycol (PTMG); condensed polyester polyols such as polyethylene adipate (PEA), polybutylene adipate (PBA) and polyhexamethylene adipate (PH2A); lactone based polyester polyols such as poly-$\epsilon$-caprolactone (PCL); polycarbonate polyols such as polyhexamethylene carbonate; and acrylic polyols. Polyols having a weight average molecular weight of 50 or greater and 2,000 or less, and particularly 100 or greater and 1,000 or less are preferred. Two or more kinds of the polyols may be used in combination.

Urethane polyol may be used for the base material. The urethane polyol has a urethane bond, and at least two or more hydroxyl groups. Preferably, the urethane polyol has hydroxyl groups at its end. The urethane polyol may be obtained by allowing a polyol and a polyisocyanate to react at a ratio by which an excess molar ratio of the hydroxyl groups of the polyol to the isocyanate groups of the polyisocyanate is provided. By using the urethane polyol as the base material, the reaction of the base material with the curing agent can be completed within a short period of time. The base material may contain urethane polyol, and a polyol not having any urethane bond.

Specific examples of the polyisocyanate used for producing the urethane polyol include aromatic polyisocyanates such as 2,4-toluene diisocyanate, 2,6-toluene diisocyanate, mixtures of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI) and paraphenylene diisocyanate (PPDI); alicyclic polyisocyanates such as 4,4'-dicyclohexylmethane diisocyanate ($H_{12}$MDI), hydrogenated xylylene diisocyanate ($H_6$XDI), hexamethylene diisocyanate (HDI) and isophorone diisocyanate (IPDI); and aliphatic polyisocyanates. Two or more polyisocyanates may be used in combination.

As described above, the curing agent contains a polyisocyanate or a derivative thereof. The aforementioned polyisocyanate as a raw material of the urethane polyol may be used in the curing agent.

The polyisocyanate particularly suited for the curing agent is a buret-modified form of hexamethylene diisocyanate. This buret-modified form has a buret bond represented by the following chemical formula. This buret bond can be provided by a reaction of an urea bond with an excess isocyanate group. This buret-modified form has a three-dimensional structure. The polyurethane obtained with the curing agent containing this buret-modified form has a weak restraining force among molecules. The paint layer 8 constituted with this polyurethane has a small Martens hardness H4. This paint layer 8 is also excellent in weather resistance.

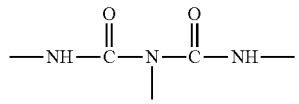

The curing agent may also contain other polyisocyanate in addition to the buret-modified form of hexamethylene diisocyanate. The percentage of this buret-modified form relative to the total amount of the polyisocyanate is preferably no less than 20% by weight, and particularly preferably no less than 50% by weight.

The NCO/OH ratio in the resin composition of the paint layer 8 is preferably 1.0/1.0 or greater and 1.4/1.0 or less, and particularly preferably 1.1/1.0 or greater and 1.3/1.0 or less.

The resin composition of the paint layer 8 may include additives such as a coloring agent (typically, titanium dioxide), an antioxidant, a light stabilizer, a fluorescent whitening agent, an ultraviolet ray absorbing agent and the like. The additive may be added either to the base material, or to the curing agent.

The paint layer 8 has a thickness of 5 µm or greater and 40 µm or less. The paint layer 8 having a thickness of no less than 5 µm can be responsible for spin performance and stability of the spin rate. In this respect, the thickness is more preferably no less than 6 µm, and particularly preferably no less than 10 µm. The paint layer 8 having a thickness of no greater than 40 µm does not lead to excessive spin upon a shot with a driver. In this respect, the thickness is more preferably no greater than 38 µm, and particularly preferably no greater than 30 µm.

The paint layer 8 is obtained by coating a liquid, which is prepared by dissolving or dispersing the base material and the curing agent in a solvent, on the surface of the cover 6. The coating may be carried out by electrostatic coating, spray coating or the like. The solvent is volatilized after the coating to permit a reaction of the base material with the curing agent thereby forming the paint layer 8. Illustrative examples of preferred solvent include toluene, isopropyl alcohol, xylene, methyl ethyl ketone, methyl isobutyl ketone, ethylene glycol monomethyl ether, ethylbenzene, propylene glycol monomethyl ether, isobutyl alcohol and ethyl acetate.

The golf ball may also have other paint layer on the internal side or the external side of the paint layer 8. The other paint layer preferably has a Martens hardness of no greater than 2.0 mgf/µm². Alternatively, the other paint layer may have a Martens hardness of greater than 2.0 mgf/µm².

It is preferred that the golf ball 2 has an amount of compressive deformation of 2.0 mm or greater and 3.5 mm or less. When the golf ball 2 having an amount of compressive deformation of no less than 2.0 mm is hit with a driver, excessive spin is not generated. In this respect, the amount of compressive deformation is more preferably no less than 2.1 mm, and particularly preferably no less than 2.2 mm. The golf ball 2 having an amount of compressive deformation of no greater than 3.5 mm is excellent in the resilience performance. In this respect, the amount of compressive deformation is more preferably no greater than 3.4 mm, and particularly preferably no greater than 3.3 mm.

EXAMPLES

Example 1

A rubber composition (1) was obtained by kneading 100 parts by weight of polybutadiene ("BR-730", trade name, available from JSR Corporation), 38 parts by weight of zinc diacrylate, 5 parts by weight of zinc oxide, an adequate amount of barium sulfate, 0.5 parts by weight of diphenyl disulfide (Sumitomo Seika Chemicals Co., Ltd.) and 0.9 parts by weight of dicumyl peroxide (NOF Corporation). The amount of barium sulfate was adjusted such that the golf ball had a weight of 45.6 g. This rubber composition (1) was placed into a mold having upper and lower mold half each having a hemispherical cavity, and heated under a temperature of 170° C. for 20 minutes to obtain a center having a diameter of 39.7 mm.

A resin composition (a) was obtained by kneading 55 parts by weight of an ionomer resin (Surlyn® 8945, supra), 45 parts by weight of other ionomer resin (Himilan® AM7329, supra) and 4 parts by weight of titanium dioxide in a biaxial kneading extruder. This resin composition (a) was rendered to cover around the center by injection molding to obtain a mid layer. The mid layer had a thickness of 1.0 mm.

A paint composition containing a two-component cured epoxy resin as a base polymer ("POLIN 750LE", trade name, available from Shinto Paint Co., Ltd.) was prepared. The base material of this paint composition consists of 30 parts by weight of a bisphenol A type solid epoxy resin and 70 parts by weight of a solvent. The curing agent of this paint composition consists of 40 parts by weight of denatured polyamide amine, 55 parts by weight of a solvent and 5 parts by weight of titanium dioxide. The weight ratio of the base material and the curing agent was 1/1. This paint composition was coated on the surface of the mid layer with a spray gun, and kept in an atmosphere of 23° C. for 12 hrs to give a reinforcing layer.

A resin composition (c) was obtained by kneading 100 parts by weight of a thermoplastic polyurethane elastomer (Elastollan® XNY90A, supra) and 3 parts by weight of titanium dioxide in a biaxial kneading extruder. Half shells were obtained from this resin composition (c) with compression molding. A sphere comprising the center, the mid layer and the reinforcing layer was covered by two pieces of the half shell. The sphere and half shells were placed into a mold having upper and lower mold half each having a hemispherical cavity to obtain a cover with compression molding. The cover had a thickness of 0.5 mm.

A polyester polyol, and a polyisocyanate containing a buret-modified form of hexamethylene diisocyanate were mixed to obtain a paint composition (VII). This composition had a NCO/OH ratio of 1.2:1.0. This paint composition (VII) was coated on the cover with a spray gun, and kept in an atmosphere at 40° C. for 24 hrs to obtain a paint layer. This golf ball had a diameter of 42.7 mm, and a weight of 45.6 g.

Examples 2 to 16, and Comparative Examples 1 to 2

Golf balls of Examples 2 to 16, and Comparative Examples 1 to 2 were obtained in a similar manner to Example 1 except that specifications of the center, the mid layer, the cover and the paint layer were as listed in Tables 4 and 5 below. The compositions of the center are presented in Table 1 below. The compositions of the mid layer and the cover are presented in Table 2 below. The compositions of the paint layer are presented in Table 3 below.

Example 17

A rubber composition (3) was obtained by kneading 100 parts by weight of polybutadiene (BR-730, supra), 31 parts by weight of zinc diacrylate, 5 parts by weight of zinc oxide, an adequate amount of barium sulfate, 0.5 parts by weight of diphenyl disulfide (Sumitomo Seika Chemicals Co., Ltd.) and 0.9 parts by weight of dicumyl peroxide (NOF Corporation). The amount of barium sulfate was adjusted such that the golf ball had a weight of 45.6 g. This rubber composition (3) was placed into a mold having upper and lower mold half each having a hemispherical cavity, and heated under a temperature of 170° C. for 20 minutes to obtain a center having a diameter of 38.9 mm.

A resin composition (b) was obtained by kneading 35 parts by weight of an ionomer resin (Surlyn® 8945, supra), 34 parts by weight of other ionomer resin (Himilan® AM7329, supra), 31 parts by weight of a styrene block-containing thermoplastic elastomer (Rabalon® T3221C, supra) and 3 parts by weight of titanium dioxide in a biaxial kneading extruder. This resin composition (b) was rendered to cover around the center by injection molding to obtain a mid layer. The mid layer had a thickness of 1.0 mm.

A resin composition (i) was obtained by kneading 22 parts by weight of an ionomer resin (Surlyn® 8945, supra), 50 parts by weight of other ionomer resin (Himilan® AM7329, supra), 20 parts by weight of an ethylene-methacrylic acid copolymer (Nucrel® 1050H, supra), 8 parts by weight of a styrene block-containing thermoplastic elastomer (Rabalon® T3221C, supra) and 3 parts by weight of titanium dioxide in a biaxial kneading extruder. This resin composition (i) was rendered to cover around the mid layer by injection molding to obtain a cover. The cover had a thickness of 1.0 mm.

The aforementioned paint composition (VII) was coated on the cover, and kept in an atmosphere at 40° C. for 24 hrs to obtain a paint layer. This golf ball had a diameter of 42.7 mm, and a weight of 45.6 g.

Examples 18 to 28, and Comparative Examples 3 to 5

Golf balls of Examples 18 to 28, and Comparative Examples 3 to 5 were obtained in a similar manner to Example 17 except that specifications of the center, the mid layer, the cover and the paint layer were as listed in Tables 6 and 7 below. The compositions of the center are presented in Table 1 below. The compositions of the mid layer and the cover are presented in Table 2 below. The compositions of the paint layer are presented in Table 3 below.
[Shot with Driver]
A driver with a titanium head was attached to a swing machine available from True Temper Co. Then the golf ball was hit under a condition to give the head speed of 45 m/sec, and the spin rate immediately after the hitting, and the travel distance (i.e., the distance from the launching point to the point where the ball stopped) were measured. Mean values of 10 times measurements are shown in Tables 4 to 7 below.
[Shot with Sand Wedge]
A sand wedge was attached to a swing machine available from True Temper Co. Then the golf ball was hit under a condition to give the head speed of 21 m/sec, and the spin rate immediately after the hitting was measured. Mean values of the spin rates Sd of 10 times measurements were determined. Furthermore, water was applied on the golf ball and the club face, and the golf balls were hit with the club. Thus, the spin rate immediately after the hitting was measured. Mean values of the spin rates Sw of 10 times measurements were determined. Spin retention rate Rs was calculated based on the spin rate Sd in the dry state and the spin rate Sw in the wet state, according to the following formula:

$$Rs=(Sw/Sd)*100$$

The results are shown in Tables 4 to 7 below.
[Durability of Paint Film]
A driver with a titanium head was attached to a swing machine available from True Temper Co. Then the golf ball was hit 150 times under a condition to give the head speed of 45 m/sec. The golf ball was visually observed, and rating was performed based on the following criteria.

A: Abrasion not found;
B: Percentage area of abraded portion being no greater than 5%;
C: Percentage area of abraded portion being greater than 5% and 25% or less
D: Percentage area of abraded portion exceeding 25%

The results are shown in Tables 4 to 7 below.

TABLE 1

Composition of Center (parts by weight)

|  | (1) | (2) | (3) | (4) |
|---|---|---|---|---|
| BR-730 | 100 | 100 | 100 | 100 |
| Zinc diacrylate | 38 | 33 | 31 | 30 |
| Zinc oxide | 5 | 5 | 5 | 5 |
| Barium sulfate | adequate amount | adequate amount | adequate amount | adequate amount |
| Diphenyl disulfide | 0.5 | 0.5 | 0.5 | 0.5 |
| Dicumyl peroxide | 0.9 | 0.9 | 0.9 | 0.9 |

TABLE 2

Composition of Mid Layer and Cover (parts by weight)

|  | (a) | (b) | (c) | (d) | (e) | (f) | (g) | (h) | (i) |
|---|---|---|---|---|---|---|---|---|---|
| Surlyn ® 8945 | 55 | 35 | — | — | — | — | 40 | 30 | 22 |
| Himilan ® AM7329 | 45 | 34 | — | — | — | — | 50 | 50 | 50 |
| Nucrel ® 1050H | — | — | — | — | — | — | 10 | 20 | 20 |
| Rabalon ® T3221C | — | 31 | — | — | — | — | — | — | 8 |
| Elastollan ® XNY90A | — | — | 100 | 55 | — | 10 | — | — | — |
| Elastollan ® XNY80A | — | — | — | — | 100 | — | — | — | — |
| Elastollan ® ET858D | — | — | — | 45 | — | 90 | — | — | — |
| Titanium dioxide | 4 | 3 | 3 | 3 | 3 | 3 | 3 | 3 | — |
| Ultramarine blue | — | — | 0.04 | 0.04 | 0.04 | 0.04 | 0.04 | 0.04 | — |
| Hardness (Shore D) | 65 | 48 | 38 | 47 | 26 | 56 | 62 | 60 | 56 |

TABLE 3

Composition of Paint Layer (NCO/OH ratio)

|  | (I) | (II) | (III) | (IV) | (V) | (VI) | (VII) |
|---|---|---|---|---|---|---|---|
| Polyol *1 | 1.00 | 1.00 | 1.00 | 1.00 | 1.00 | 1.00 | — |
| Polyol *2 | — | — | — | — | — | — | 1.00 |
| Nurate form of hexamethylene diisocyanate | 0.84 | — | — | — | — | — | — |
| Buret-modified product of hexamethylene diisocyanate | — | 1.20 | 0.84 | 0.60 | 0.24 | 0.18 | 1.20 |
| Isophorone diisocyanate | 0.36 | — | 0.36 | 0.60 | 0.96 | 1.02 | — |
| Martens hardness (mgf/μm$^2$) | 4.2 | 0.18 | 1.4 | 1.7 | 2.0 | 2.2 | 0.12 |

*1: Mixture of polyether polyol and polyester polyol
Hydroxyl value: 82 mgKOH/g
*2: Polyester polyol
Hydroxyl value: 170 mgKOH/g

TABLE 4

Evaluation Results

|  |  | Com. Exa. 1 | Exa. 2 | Exa. 3 | Exa. 4 | Exa. 5 | Com. Exa. 2 | Exa. 1 |
|---|---|---|---|---|---|---|---|---|
| Center | Composition | (1) | (1) | (1) | (1) | (1) | (1) | (1) |
|  | Diameter (mm) | 39.7 | 39.7 | 39.7 | 39.7 | 39.7 | 39.7 | 39.7 |
|  | Surface hardness H1 (JIS-C) | 84 | 84 | 84 | 84 | 84 | 84 | 84 |
| Mid layer | Composition | (a) | (a) | (a) | (a) | (a) | (a) | (a) |
|  | Hardness H2 (Shore D) | 65 | 65 | 65 | 65 | 65 | 65 | 65 |
|  | Diameter (mm) | 41.7 | 41.7 | 41.7 | 41.7 | 41.7 | 41.7 | 41.7 |
|  | Thickness (mm) | 1.0 | 1.0 | 1.0 | 1.0 | 1.0 | 1.0 | 1.0 |
| Cover | Composition | (c) | (c) | (c) | (c) | (c) | (c) | (c) |
|  | Hardness H3 (Shore D) | 38 | 38 | 38 | 38 | 38 | 38 | 38 |
|  | Thickness (mm) | 0.5 | 0.5 | 0.5 | 0.5 | 0.5 | 0.5 | 0.5 |

TABLE 4-continued

Evaluation Results

|  |  | Com. Exa. 1 | Exa. 2 | Exa. 3 | Exa. 4 | Exa. 5 | Com. Exa. 2 | Exa. 1 |
|---|---|---|---|---|---|---|---|---|
| Paint layer | Composition | (I) | (II) | (III) | (IV) | (V) | (VI) | (VII) |
|  | Thickness (μm) | 18 | 18 | 18 | 18 | 18 | 18 | 18 |
|  | Hardness H4 (mgf/μm²) | 4.2 | 0.18 | 1.4 | 1.7 | 2.0 | 2.2 | 0.12 |
| Ball | Compressive Deformation (mm) | 2.3 | 2.3 | 2.3 | 2.3 | 2.3 | 2.3 | 2.3 |
| Driver | Spin rate (rpm) | 2900 | 2920 | 2920 | 2900 | 2900 | 2900 | 2950 |
|  | Travel distance (m) | 240 | 240 | 240 | 240 | 240 | 240 | 239 |
| Sand wedge | Spin rate Sd (rpm) | 6800 | 6860 | 6850 | 6840 | 6830 | 6810 | 6900 |
|  | Spin rate Sw (rpm) | 4500 | 5500 | 5000 | 4900 | 4800 | 4600 | 5600 |
|  | Rate Rs (%) | 66 | 80 | 73 | 72 | 70 | 68 | 81 |
| Durability of paint film |  | D | A | B | B | B | D | A |

TABLE 5

Evaluation Results

|  |  | Exa. 6 | Exa. 7 | Exa. 8 | Exa. 9 | Exa. 10 | Exa. 11 | Exa. 12 | Exa. 13 | Exa. 14 | Exa. 15 | Exa. 16 |
|---|---|---|---|---|---|---|---|---|---|---|---|---|
| Center | Composition | (1) | (1) | (1) | (1) | (1) | (1) | (1) | (1) | (1) | (1) | (2) |
|  | Diameter (mm) | 39.7 | 39.7 | 39.7 | 39.7 | 39.7 | 39.7 | 39.7 | 40.1 | 38.9 | 38.3 | 39.7 |
|  | Surface hardness H1 (JIS-C) | 84 | 84 | 84 | 84 | 84 | 84 | 84 | 84 | 84 | 84 | 82 |
| Mid layer | Composition | (a) | (a) | (a) | (a) | (a) | (a) | (a) | (a) | (a) | (a) | (a) |
|  | Hardness H2 (Shore D) | 65 | 65 | 65 | 65 | 65 | 65 | 65 | 65 | 65 | 65 | 65 |
|  | Diameter (mm) | 41.7 | 41.7 | 41.7 | 41.7 | 41.7 | 41.7 | 41.7 | 42.1 | 40.9 | 40.3 | 41.7 |
|  | Thickness (mm) | 1.0 | 1.0 | 1.0 | 1.0 | 1.0 | 1.0 | 1.0 | 1.0 | 1.0 | 1.0 | 1.0 |
| Cover | Composition | (c) | (c) | (c) | (c) | (e) | (d) | (f) | (c) | (c) | (c) | (c) |
|  | Hardness H3 (Shore D) | 38 | 38 | 38 | 38 | 26 | 47 | 56 | 38 | 38 | 38 | 38 |
|  | Thickness (mm) | 0.5 | 0.5 | 0.5 | 0.5 | 0.5 | 0.5 | 0.5 | 0.3 | 0.9 | 1.2 | 0.5 |
| Paint layer | Composition | (VII) | (VII) | (VII) | (VII) | (VII) | (VII) | (VII) | (VII) | (VII) | (VII) | (VII) |
|  | Thickness (μm) | 4 | 6 | 38 | 45 | 18 | 18 | 18 | 18 | 18 | 18 | 18 |
|  | Hardness H4 (mgf/μm²) | 0.12 | 0.12 | 0.12 | 0.12 | 0.12 | 0.12 | 0.12 | 0.12 | 0.12 | 0.12 | 0.12 |
| Ball | Compressive Deformation (mm) | 2.3 | 2.3 | 2.3 | 2.3 | 2.4 | 2.3 | 2.2 | 2.3 | 2.3 | 2.2 | 2.9 |
| Driver | Spin rate (rpm) | 2900 | 2930 | 2980 | 3000 | 3000 | 2850 | 2750 | 2850 | 3050 | 3200 | 2850 |
|  | Travel distance (m) | 240 | 239 | 238 | 237 | 237 | 241 | 242 | 241 | 236 | 234 | 238 |
| Sand wedge | Spin rate Sd (rpm) | 6820 | 6850 | 6950 | 7000 | 7150 | 6500 | 6000 | 6400 | 7200 | 7400 | 6800 |
|  | Spin rate Sw (rpm) | 4950 | 5250 | 5800 | 5900 | 5900 | 5100 | 4300 | 5000 | 5800 | 6000 | 5500 |
|  | Rate Rs (%) | 73 | 77 | 83 | 84 | 83 | 78 | 72 | 78 | 81 | 81 | 81 |
| Durability of paint film |  | A | A | A | A | A | A | A | A | A | A | A |

TABLE 6

Evaluation Results

|  |  | Com. Exa. 3 | Exa. 18 | Exa. 19 | Exa. 20 | Exa. 21 | Com. Exa. 4 | Exa. 17 |
|---|---|---|---|---|---|---|---|---|
| Center | Composition | (3) | (3) | (3) | (3) | (3) | (3) | (3) |
|  | Diameter (mm) | 38.9 | 38.9 | 38.9 | 38.9 | 38.9 | 38.9 | 38.9 |
|  | Surface hardness H1 (JIS-C) | 81 | 81 | 81 | 81 | 81 | 81 | 81 |
| Mid layer | Composition | (b) | (b) | (b) | (b) | (b) | (b) | (b) |
|  | Hardness H2 (Shore D) | 48 | 48 | 48 | 48 | 48 | 48 | 48 |
|  | Diameter (mm) | 40.9 | 40.9 | 40.9 | 40.9 | 40.9 | 40.9 | 40.9 |
|  | Thickness (mm) | 1.0 | 1.0 | 1.0 | 1.0 | 1.0 | 1.0 | 1.0 |
| Cover | Composition | (i) | (i) | (i) | (i) | (i) | (i) | (i) |
|  | Hardness H3 (Shore D) | 56 | 56 | 56 | 56 | 56 | 56 | 56 |
|  | Thickness (mm) | 0.9 | 0.9 | 0.9 | 0.9 | 0.9 | 0.9 | 0.9 |
| Paint layer | Composition | (I) | (II) | (III) | (IV) | (V) | (VI) | (VII) |
|  | Thickness (μm) | 18 | 18 | 18 | 18 | 18 | 18 | 18 |
|  | Hardness H4 (mgf/μm²) | 4.2 | 0.18 | 1.4 | 1.7 | 2.0 | 2.2 | 0.12 |
| Ball | Compressive Deformation (mm) | 3.2 | 3.2 | 3.2 | 3.2 | 3.2 | 3.2 | 3.2 |
| Driver | Spin rate (rpm) | 2500 | 2540 | 2530 | 2520 | 2520 | 2520 | 2550 |
|  | Travel distance (m) | 242 | 241 | 242 | 242 | 242 | 242 | 241 |

TABLE 6-continued

Evaluation Results

| | | Com. Exa. 3 | Exa. 18 | Exa. 19 | Exa. 20 | Exa. 21 | Com. Exa. 4 | Exa. 17 |
|---|---|---|---|---|---|---|---|---|
| Sand wedge | Spin rate Sd (rpm) | 6300 | 6380 | 6350 | 6330 | 6320 | 6310 | 6400 |
| | Spin rate Sw (rpm) | 4000 | 4800 | 4500 | 4400 | 4300 | 4050 | 5000 |
| | Rate Rs (%) | 63 | 75 | 71 | 70 | 68 | 64 | 78 |
| Durability of paint film | | A | A | A | A | A | A | A |

TABLE 7

Evaluation Results

| | | Exa. 22 | Exa. 23 | Exa. 24 | Exa. 25 | Exa. 26 | Com. Exa. 5 | Exa. 27 | Exa. 28 |
|---|---|---|---|---|---|---|---|---|---|
| Center | Composition | (3) | (3) | (3) | (3) | (3) | (4) | (3) | (3) |
| | Diameter (mm) | 38.9 | 38.9 | 38.9 | 38.9 | 38.9 | 38.9 | 39.7 | 38.3 |
| | Surface hardness H1 (JIS-C) | 81 | 81 | 81 | 81 | 81 | 81 | 81 | 81 |
| Mid layer | Composition | (b) | (b) | (b) | (b) | (b) | (b) | (b) | (b) |
| | Hardness H2 (Shore D) | 48 | 48 | 48 | 48 | 48 | 48 | 48 | 48 |
| | Diameter (mm) | 40.9 | 40.9 | 40.9 | 40.9 | 40.9 | 40.9 | 41.7 | 40.3 |
| | Thickness (mm) | 1.0 | 1.0 | 1.0 | 1.0 | 1.0 | 1.0 | 1.0 | 1.0 |
| Cover | Composition | (i) | (i) | (i) | (i) | (h) | (g) | (i) | (i) |
| | Hardness H3 (Shore D) | 56 | 56 | 56 | 56 | 60 | 62 | 56 | 56 |
| | Thickness (mm) | 0.9 | 0.9 | 0.9 | 0.9 | 0.9 | 0.9 | 0.5 | 1.2 |
| Paint layer | Composition | (VII) | (VII) | (VII) | (VII) | (VII) | (VII) | (VII) | (VII) |
| | Thickness (μm) | 4 | 6 | 38 | 45 | 18 | 18 | 18 | 18 |
| | Hardness H4 (mgf/μm$^2$) | 0.12 | 0.12 | 0.12 | 0.12 | 0.12 | 0.12 | 0.12 | 0.12 |
| Ball | Compressive Deformation (mm) | 3.2 | 3.2 | 3.2 | 3.2 | 3.1 | 3.2 | 3.3 | 3.2 |
| Driver | Spin rate (rpm) | 2500 | 2530 | 2580 | 2650 | 2420 | 2350 | 2650 | 2550 |
| | Travel distance (m) | 242 | 241 | 240 | 238 | 244 | 245 | 239 | 238 |
| Sand wedge | Spin rate Sd (rpm) | 6300 | 6330 | 6470 | 6550 | 6000 | 5400 | 6450 | 6000 |
| | Spin rate Sw (rpm) | 4500 | 4700 | 5050 | 5200 | 4200 | 3650 | 5200 | 4500 |
| | Rate Rs (%) | 71 | 74 | 78 | 79 | 70 | 68 | 81 | 75 |
| Durability of paint film | | A | A | A | A | A | A | A | A |

As shown in Tables 4 to 7, the golf ball of each Example is excellent in a variety of performances. Therefore, advantages of the present invention are clearly suggested by these results of evaluation.

The golf ball according to the present invention is particularly suited for use in golf tournaments. The foregoing description is just for illustrative examples; therefore, various modifications can be made in the scope without departing from the principles of the present invention.

What is claimed is:

1. A golf ball comprising a core, a cover situated on the external side of the core, and a paint layer situated on the external side of the cover, wherein
   the cover has a Shore D hardness of no greater than 61,
   the paint layer has a Martens hardness of no less than 0.01 mgf/μm$^2$ and no greater than 2.0 mgf/μm$^2$,
   the base polymer of the paint layer is a polyurethane obtained by a reaction of a polyol having a weight-average molecular weight of 50 to 2,000 with a polyisocyanate, and
   the base polymer of the cover is at least one member selected from the group consisting of a polyurethane, an ionomer resin, a polyamide, a polyester, a polystyrene and a polyolefin.

2. The golf ball according to claim 1, wherein the base polymer of the paint layer is a polyurethane obtained by a reaction of a polyol with a polyisocyanate, and the NCO/OH ratio in the polyurethane is 1.0/1.0 to 1.4/1.0.

3. The golf ball according to claim 1, wherein the paint layer has a thickness of 5 μm to 40 μm.

4. The golf ball according to claim 1, wherein the cover has a Shore D hardness of no greater than 55.

5. The golf ball according to claim 1, wherein the cover has a thickness of 0.3 mm to 1.0 mm.

6. The golf ball according to claim 1, wherein the amount of compressive deformation of the core is 1.8 mm to 4.0 mm, as measured under a condition in which the initial load is 98 N and the final load is 1,274 N.

7. The golf ball according to claim 1, wherein the core has a center and a mid layer situated on the external side of the center, and the surface of the center has a JIS-C hardness of 60 to 95.

8. The golf ball according to claim 1, wherein the core has a center and a mid layer situated on the external side of the center, and the amount of compressive deformation of the center is 1.5 mm to 5.0 mm, as measured under a condition in which the initial load is 98 N and the final load is 1,274 N.

9. The golf ball according to claim 1, wherein the core has a center and a mid layer situated on the external side of the center, and the center has a diameter of 30 mm to 41.5 mm.

10. The golf ball according to claim 1, wherein the core has a center and a mid layer situated on the external side of the center, and the center has a weight of 25 g to 42 g.

11. The golf ball according to claim 1, wherein the core has a center and a mid layer situated on the external side of the center, and the base polymer of the mid layer is at least one selected from the group consisting of an ionomer resin, a styrene block-containing thermoplastic elastomer, a thermoplastic polyester elastomer, a thermoplastic polyamide elastomer, a thermoplastic polyurethane elastomer and a thermoplastic polyolefin elastomer.

12. The golf ball according to claim 1, wherein the core has a center and a mid layer situated on the external side of the center, and the mid layer has a Shore D hardness of 40 to 75.

13. The golf ball according to claim 1, wherein the core has a center and a mid layer situated on the external side of the center, and the mid layer has a thickness of 0.3 mm to 2.5 mm.

14. The golf ball according to claim 1 having an amount of compressive deformation of 2.0 mm to 3.5 mm, as measured under a condition in which the initial load is 98 N and the final load is 1,274 N.

15. The golf ball according to claim 1, wherein the polyisocyanate contains a buret-modified form of hexamethylene diisocyanate.

16. The golf ball according to claim 15, wherein the percentage of the buret-modified form relative to the total amount of the polyisocyanate is no less than 20% by weight.

17. The golf ball according to claim 16, wherein the percentage of the buret-modified form relative to the total amount of the polyisocyanate is no less than 50% by weight.

18. The golf ball according to claim 1, wherein the cover has a Shore D hardness of no greater than 58, when the base polymer of the cover is the ionomer resin.

19. The golf ball according to claim 1, wherein the cover has a Shore D hardness of no greater than 45, when the base polymer of the cover is the polyurethane.

20. A golf ball comprising a core, a cover situated on the external side of the core, and a paint layer situated on the external side of the cover, wherein
the cover has a Shore D hardness of no greater than 61,
the paint layer has a Martens hardness of no less than 0.01 mgf/$\mu$m$^2$ and no greater than 2.0 mgf/$\mu$m$^2$,
the base polymer of the paint layer is a polyurethane obtained by a reaction of a polyol having a weight-average molecular weight of 50 to 2,000 with a polyisocyanate, and
the base polymer of the cover is at least one member selected from the group consisting of a polyurethane, an ionomer resin, a polyamide, a polyester, a polystyrene and a polyolefin, wherein the Shore D hardness of the cover and the Martens hardness of the paint layer represent a compatible softness such that the deforming of the paint layer follows the deforming of the cover.

21. The golf ball according to claim 1, wherein the paint layer has a Martens hardness of no less than 0.12 mgf/$\mu$m$^2$ and no greater than 2.0 mgf/$\mu$m$^2$.

22. The golf ball according to claim 20, wherein the paint layer has a Martens hardness of no less than 0.12 mgf/$\mu$m$^2$ and no greater than 2.0 mgf/$\mu$m$^2$.

* * * * *